Feb. 3, 1959   L. A. G. ROUJOB   2,871,973
APPARATUS FOR WASHING GASES
Filed Feb. 23, 1956
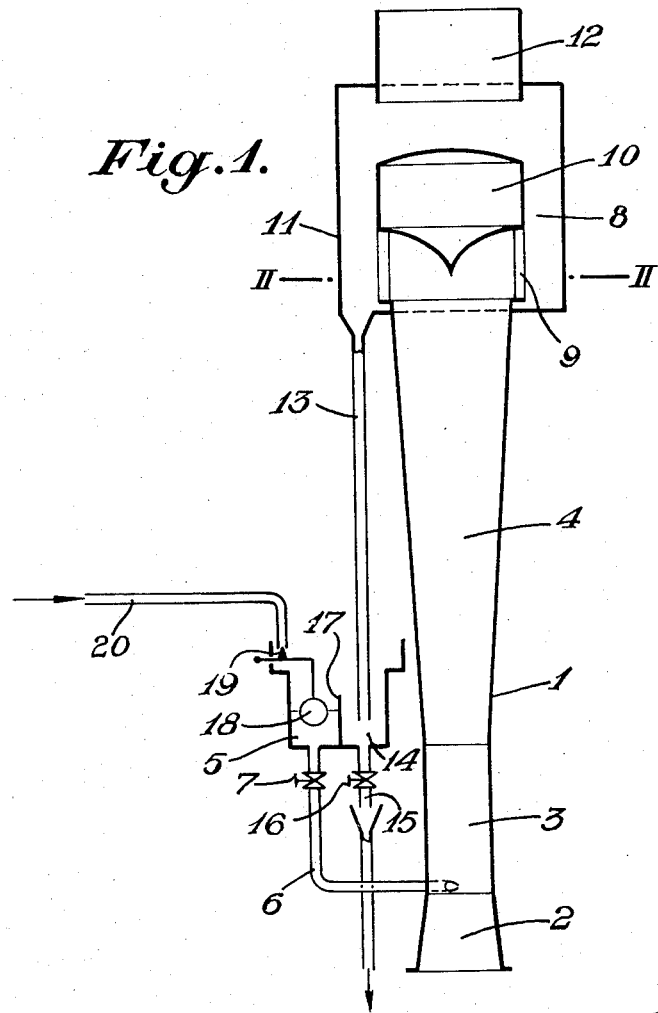
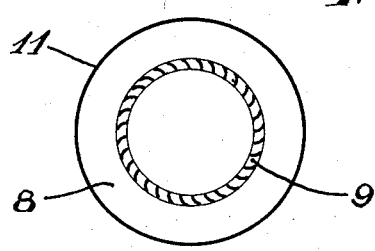
Inventor
Leopold Antoine Guillaume Roujob
by Benj. T. Rauber
his attorney 2,871,973
Patented Feb. 3, 1959

2,871,973
APPARATUS FOR WASHING GASES

Léopold Antoine Guillaume Roujob, Brussels, Belgium, assignor to Societe Belge Prat-Daniel, Societe Anonyme, Brussels, Belgium, a Belgian company Application February 23, 1956, Serial No. 567,375

Claims priority, application Belgium March 4, 1955

2 Claims. (Cl. 183—3)

My present invention relates to an apparatus for washing gases with the object of separating the solid and liquid particles contained in suspension therein, as also to an apparatus for carrying out this process.

It is known to purify gases by washing by means of a finely atomised liquid. Processes in which atomising means are employed for this purpose have the disadvantage that a purified liquid must be employed therein in order to avoid obstruction of the small orifices of the atomising devices. It is thus necessary to constantly renew the liquid or purify same after each operation, which increases the cost of the gas-washing processes having regard to the large quantities of gases treated in some instances.

The aforesaid disadvantages are obviated by the process and the apparatus according to the present invention, with which it is possible to avoid the use of atomising means and to recycle the washing liquid without first subjecting it to a high degree of purification.

In accordance with the invention, the rising movement of the gas in a flue duct is utilised to effect the atomisation of the washing liquid, the liquid being allowed to flow under the action of gravity on to the inner wall of the beginning of the duct in such manner as to spread out over the said wall and to be upwardly entrained along the said wall by the current of gas which scatters it in fine droplets to which the solid or liquid particles contained in the gas become fixed, whereafter they are eliminated with the droplets in a static centrifugal separator connected on to the duct.

The polluted liquid collected in the separator is reused as such or after decanting for the supply of washing liquid to the flue duct.

Preferably, the liquid is introduced into the duct tangentially in relation thereto so as to distribute it annularly over the inner wall of the duct and thus to promote the spreading and entrainment thereof over the said wall by the current of gas.

It is also advantageous to introduce the washing liquid into the gas duct at a point thereof at which the speed of flow of the gas is increased, for example by a constriction in the duct, the speed being such as to ensure spreading of the liquid over the wall and the rising movement and atomisation thereof by virtue of the great difference in speed between the liquid and the gas.

The speed of the gas is thereafter reduced in a part of the duct, for example of flared form, in which there prevails a strong turbulence which is appropriate for the intimate mixing and the contact of the liquid droplets and of the particles to be extracted.

In a preferred embodiment of the invention, the apparatus for carrying out the gas-washing comprises a convergent-divergent duct disposed in the path of discharge of the gas to be purified and having between its convergent and divergent portions a cylindrical portion, into the bottom of which there open one or more tangential ducts carrying the washing liquid from a reservoir which is connected, with the interposition of a decanting vessel, to the jacket of a static centrifugal separator mounted on the upper end of the duct.

A gas-washing apparatus of this form is illustrated by way of example in the accompanying drawings.

Figure 1 shows the whole apparatus in vertical section, and Figure 2 is a section through the static separator along the line II—II of Figure 1.

1 designates the vertical duct designed to be disposed in the path of discharge of the gases and formed of a convergent portion 2, a narrowed cylindrical portion 3 and a divergent portion 4, through which the gas circulates at high speed from the bottom upwards.

The washing liquid is gravity-fed from a constant-level reservoir 5 through one or more ducts 6 in a quantity adjusted by a cock 7, to the bottom of the cylindrical portion 3 of the duct in a direction tangential thereto. The said liquid spreads out over the inner wall in the form of a film which the current of gas, the speed of which is increased by the narrowing of the portion 3, carries upwards and scatters in fine droplets due to the considerable difference between the speeds of the gas and of the liquid. The liquid thus atomised becomes intimately mixed with the gas in the divergent portion 4, in which an intense turbulence prevails, and the solid or liquid particles contained in the gas become fixed to the droplets of washing liquid.

On leaving the divergent portion, the mixture of gas and washing liquid reaches the droplet separator 8 comprising a ring of fixed blades 9, a conical deflector 10 and a cylindrical jacket 11, on the upper end of which the gas discharge chimney 12 is mounted. The conical deflector radially deflects the mixture and the ring of blades imparts thereto a rotational movement in the jacket 11, in which the droplets charged with solid and liquid particles are projected on to the cylindrical wall under the action of the centrifugal force resulting from the rotation. While the purified gas escapes through the chimney 12, the liquid collected in the jacket of the separator flows through the duct 13 into the decanting vessel 14. This polluted liquid could be employed as it is for washing the gas, but it is preferable first to decant it in order to eliminate at least some of the solid particles. The sludge is discharged from the decanting vessel through the discharge pipe 15 provided with the adjusting cock 16, and the partially clarified liquid passes through the overflow 17, the height and delivery of which are adjustable, into the reservoir 5. A constant liquid level is maintained in the said reservoir by a float 18 controlling the needle of a valve 19 in a supply conduit 20, which supplies the liquid necessary for compensating for the liquid losses due to evaporation and to the discharge of the sludge.

The washing apparatus described operates economically and without any driving force for pumping the circulating liquid. It cannot be fouled or obstructed and permits a ready adjustment of the concentration by weight of the liquid particles in the gas.

Naturally, the invention is not limited to the embodiment described and modifications may be made thereto without departing from the scope thereof.

I claim:

1. Gas washing apparatus which comprises a vertical duct having an upper portion that diverges upwardly and a lower portion of uniform cross-section, said lower portion having an axial inlet at its lower end, a static centrifugal separator connected to the upper end of said diverging portion to separate suspended particles of liquid from gas, a chamber positioned at the upper part of said duct to receive particles separated from said centrifugal separator, and a circulating water circuit, comprising a collecting vessel below said chamber and above the lower end of said vertical duct, said collecting vessel having means to separate solids from water, a conduit from said chamber to said vessel, and a conduit for said water from said vessel to said lower portion of said duct to distribute said water about the inner surface of said lower portion below the lower end of said upper portion to be carried up by the upflow of gas through said duct as a film on the inner surface of said lower portion and as a suspension in said gas through said upper portion to said centrifugal separator.

2. Gas washing apparatus which comprises in combination, a vertical duct of constant cross-section for the passage of gas to be washed, a vertical duct having a cross-section which diverges progressively upwards at a relatively acute angle to the vertical and connected with its narrower end to the upper end of said duct of constant longitudinal cross-section, a chamber above said latter duct, a static centrifugal separator connected to the broader upper end of said duct of progressively diverging cross-section and opening peripherally into said chamber, a chimney connected to the upper part of said chamber above said separator, a decanting vessel below said chamber, a conduit from the bottom of said chamber to said vessel, said decanting vessel having a regulable outflow for collected mud and an overflow, a feeding water vessel to receive said overflow, at least one connecting pipe connected to said feeding water vessel and having the opposite, lower end, tangentially opening into the lower end of said duct of constant longitudinal cross-section, an inlet for gas to be washed positioned axially at the lower end of said duct of constant cross-section to supply a stream of gas upwardly through said duct of constant longitudinal cross-section to carry the washing liquid into said duct of progressively diverging cross-section and to said centrifugal separator.

References Cited in the file of this patent

UNITED STATES PATENTS

| | | |
|---|---|---|
| 1,920,437 | Sillers | Aug. 1, 1933 |
| 2,161,122 | Anderson | June 6, 1939 |
| 2,238,280 | Nutting | Apr. 15, 1941 |
| 2,259,034 | Fisher | Oct. 14, 1941 |
| 2,385,077 | Harker et al. | Sept. 18, 1945 |
| 2,409,088 | Weits et al. | Oct. 8, 1946 |
| 2,585,440 | Collins | Feb. 12, 1952 |
| 2,797,904 | Voorheis | July 2, 1957 |